United States Patent [19]

Ishikawa et al.

[11] Patent Number: 5,536,777
[45] Date of Patent: Jul. 16, 1996

[54] POLYETHYLENE COMPOSITION FOR USE IN INSULATIONS AND JOINTS OF EXTRA-HIGH VOLTAGE POWER CABLES, AND AN EXTRA-HIGH VOLTAGE POWER CABLE AND JOINT THEREFOR EMPLOYING THIS POLYETHYLENE COMPOSITION

[75] Inventors: Izumi Ishikawa, Chiba; Hiroyuki Miyata, Narashino; Thoru Nakatsuka, Tokyo; Kazuhiko Goto, Sakura; Kenji Matsui, Tokyo; Shiro Nakayama, Yachiyo; Tohru Takahashi, Tokyo; Mitutaka Tanida; Toshio Niwa, both of Yachiyo, all of Japan

[73] Assignees: Fujikura Ltd.; NOF Corporation, both of Tokyo, Japan; a part interest

[21] Appl. No.: 202,098

[22] Filed: Feb. 25, 1994

[30] Foreign Application Priority Data

| Feb. 26, 1993 | [JP] | Japan | 5-039098 |
| Feb. 26, 1993 | [JP] | Japan | 5-039099 |
| Feb. 26, 1993 | [JP] | Japan | 5-039100 |
| Feb. 26, 1993 | [JP] | Japan | 5-039101 |

[51] Int. Cl.[6] ............................................. C08K 3/00
[52] U.S. Cl. ............................... 524/576; 174/110 SR; 174/110 PM; 524/581
[58] Field of Search ......................... 524/576, 581; 174/110 SR, 110 PM

[56] References Cited

U.S. PATENT DOCUMENTS 4,129,552  12/1978  Galaj et al. .......................... 528/496

*Primary Examiner*—Bernard Lipman
*Attorney, Agent, or Firm*—Oblon, Spivak, McClelland, Maier & Neustadt

[57] ABSTRACT

A polyethylene composition which is useful in insulations and joints of extra-high voltage power cables, and in which a cross-linking agent, comprising an organic peroxide subjected to purification processing, and an antioxidant, are blended, wherein the cross-linked composition has a dielectric loss tangent (tanδ) of less than or equal to 0.07% at a temperature of 90° C. and under an electric field stress of 20 kV/mm. This polyethylene composition exhibits little dielectric loss, even at high temperatures or high electric field stresses, and is optimally employed in insulations and joints for extra-high voltage power cables of 275 kV or more.

8 Claims, 1 Drawing Sheet

POLYETHYLENE COMPOSITION FOR USE IN INSULATIONS AND JOINTS OF EXTRA-HIGH VOLTAGE POWER CABLES, AND AN EXTRA-HIGH VOLTAGE POWER CABLE AND JOINT THEREFOR EMPLOYING THIS POLYETHYLENE COMPOSITION

BACKGROUND OF THE INVENTION

1. Technical Field

The present invention relates to a polyethylene composition for use in insulations and joints of extra-high voltage power cables, and to an extra-high voltage power cable and a joint using this polyethylene composition. In particular, the present invention relates to a cross-linking polyethylene composition having an extremely small amount of dielectric loss which is highly suitable for use in insulations and the like of extra-high voltage power cables of 275 kV or more.

2. Background Art

Conventionally, cross-linking polyethylene compositions were known in which an organic peroxide such as dicumyl peroxide or the like was added to low density polyethylene as a cross-linking agent, this was mixed and heated, and thus caused to cross-link; as a result of the superior characteristics thereof, such as the resistance to heat, and the electrically insulating properties, and the like, such compositions were widely employed as insulationss for electric power cables.

However, in cases in which power cables employing conventional cross-linked polyethylene compositions as insulations were used in the power transmission of extra-high voltage alternating current of 275 kV or more, the highest temperature during normal service reached 90° C. and the electric field stress exceeded 20 kV/mm, so that there was a problem in that dielectric loss was large, and it was thus difficult to use such power cables.

SUMMARY OF THE INVENTION

It is an object of the present invention to obtain a polyethylene composition for insulations and joints of extra-high voltage power cables which have extremely little dielectric loss even at high temperatures or under conditions of high electric field stress. Furthermore, it is a further object of the present invention to obtain an extra-high voltage power cable of 275 kV or greater. Furthermore, it is another object of the present invention to obtain a joint which is employable in the jointing portion of such an extra-high voltage power cable.

In accordance with the present invention, a polyethylene composition (I) for use in insulations and joints for extra-high voltage power cables is provided, wherein a composition obtained after the cross-linking of a polyethylene composition, into which a cross-linking agent comprising an organic peroxide subjected to purification processing and an antioxidant are blended, which is employable in insulations and joints for extra-high voltage power cables, has a dielectric loss tangent (tanδ) of 0.07% or less at a temperature of 90° C. and at an electric field stress within a range of 20 kV/mm.

Furthermore, in accordance with the present invention, an extra-high voltage power cable having an insulating layer comprising polyethylene composition (I) is provided.

Furthermore, in accordance with the present invention, a joint for extra-high voltage cables comprising polyethylene composition (I) is provided.

In the polyethylene composition (I) of claim 1, the electroconductive impurities which are the cause of the increase in the dielectric loss tangent (tanδ) at high temperatures and under high electric field stress are not present, and accordingly, it is possible to suppress the increase in size of the dielectric loss tangent (tanδ) caused by the electroconductive impurities, and by means of this, it is possible to produce insulations and joints for use in extra-high voltage cables having little dielectric loss.

Furthermore, in the extra-high voltage cable of claim 7, an insulating layer, comprising polyethylene composition (I), is present, so that, since the dielectric loss tangent of the insulating layer is small, the dielectric loss of the cable itself is small, even when used for extra-high voltage of 275 kV or more.

Furthermore, the joint for extra-high voltage cables of claim 8 comprises polyethylene composition (I), so that, since the dielectric loss tangent of the joint is small, the dielectric loss of the joint is small even when used in extra-high voltage alternating current power transmission of 275 kV or more.

EMBODIMENTS

First, the polyethylene composition (I) of the present invention will be explained. This polyethylene composition (I) is employed in insulations and joints of extra-high voltage power cables, and a cross-linking agent comprising an organic peroxide subjected to purification processing and an antioxidant are blended thereinto; after the composition has been subjected to cross-linking, the dielectric loss tangent (tanδ) is less than or equal to 0.07% at a temperature of 90° C. and under an electric field stress of 20 kV/mm.

The cross-linking agent which is employed herein is not particularly limited. Examples thereof include dicumyl peroxide, α,α'-bis(t-butylperoxy)diisopropyl benzene, 2,5-dimethyl-2,5-di(t-butylperoxy)hexane-3, 2,5-dimethyl-2,5-di(t-butylperoxy)hexane, t-butyl)cumyl peroxide, and the like; among these, dicumyl peroxide is preferable.

Furthermore, no particular limitations are made with respect to the antioxidant; examples thereof include 4,4'-thiobis-(6-tertbutyl-3-methyl phenol), distearyl-thiodipropionate, n-octadecyl-3-(4'-hydroxy-3', 5'-di-t-butyl)phenyl propionate, and the like.

Figure 1:
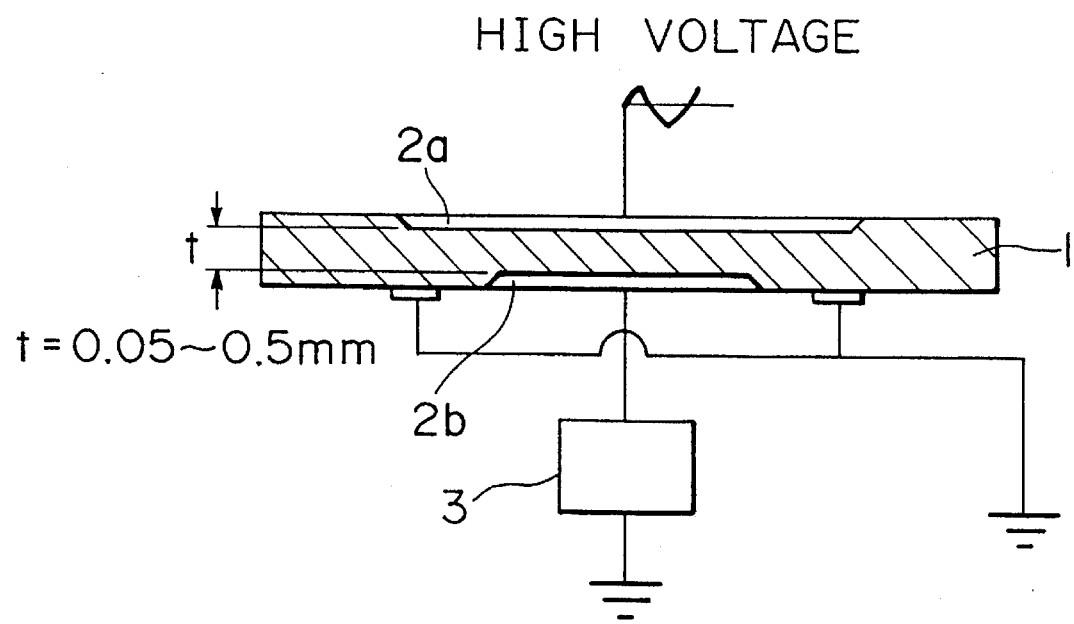
FIG. 1 is an explanatory diagram of the measurement method of the dielectric loss tangent.

In the method of measuring the dielectric loss tangent, low density polyethylene compounds produced by various production methods were prepared. Next, 2 parts per weight of DCP (dicumyl peroxide), and 0.2 parts per weight of a thiobisphenol type antioxidant were added to 100 parts per weight of each of the compounds thus prepared, these mixtures were kneaded, formed into sheets, heated, and subjected to cross-linking so as to form cross-linked polyethylene sheets. Next, the various sheets thus obtained were employed as test materials 1 shown in FIG. 1, stainless steel electrodes 2a and 2b were placed in contact with the sides of these test materials 1, test materials 1 were grounded on the electrode 2b side, and a measuring instrument 3 was connected to electrode 2b; in this state, a high voltage was applied to electrode 2a, and the tanδ (dielectric loss tangent) value was measured. Here, the thickness of the active part of testing materials 1 is shown in FIG. 1 as "t". In addition, the measurement conditions were such that the atmospheric temperature of measurement was 90° C. and the applied stress was in a range of 20 kV/mm.

Concrete examples of polyethylene compounds fulfilling the conditions of the above-described polyethylene composition (I), that is to say, the condition that the dielectric loss tangent at a temperature of 90° C. and under an electric field stress within a range of 20 kV/mm be less than or equal to 0.07%, include, for example, polyethylene composition (II), polyethylene composition (III), polyethylene composition (IV), polyethylene composition (V), polyethylene composition (VI), and the like, which will be explained in detail hereinbelow.

Next, polyethylene compounds (II)–(IV) will be explained.

Polyethylene composition (II) is such that, in polyethylene composition (I), the above-described polyethylene composition is such that the relationship between the dielectric loss tangent ($\tan\delta_2$) and volume resistivity ($\rho_2$) of the cross-linked composition, wherein a cross-linking agent and an antioxidant are blended into a low-density polyethylene, after being subjected to extraction processing with an organic solvent, and the dielectric loss tangent ($\tan\delta_1$) and volume resistivity ($\rho_1$) of the composition prior to extraction, is such that, under conditions of a temperature of 90° C. and a stress of 20 kV/mm, $$\tan\delta_1/\tan\delta_2 \leq 5$$

and/or $$\rho_2/\rho_1 \leq 5.$$

Furthermore, the polyethylene composition (III) is such that, in polyethylene composition (I), the polyethylene composition is such that a value obtained when the volume resistivity of an extract obtained when 10 g of a composition, in which 1–5 parts per weight of a cross-linking agent comprising an organic peroxide subjected to purification processing and 0.05–0.5 parts per weight of an antioxidant are blended in 100 parts per weight of low density polyethylene and this is cross-linked, is treated with 10 ml of nonpolar solvent, is its value multiplied by the viscosity of the extract, is greater than or equal to $5\times10^{10}$ Ω Pa/m.

Furthermore, the polyethylene composition (IV) is such that, in polyethylene composition (I), the above-described polyethylene composition is such that a value obtained when the amount of increase in conductivity of an extract obtained when 10 g of a composition, in which 1–5 parts per weight of a cross-linking agent comprising an organic peroxide subjected to purification processing and 0.05–0.5 parts per weight of an antioxidant are blended in 100 parts per weight of low density polyethylene and this is subjected to cross-linking, are treated with 10 ml of a polar solvent, its value divided by the viscosity of the extract, is less than or equal to $5\times10^{-5}$ S/Pams.

Contaminant sources of the electroconductive impurities which are contained in the insulating composition and which are carried over into the insulating layer of the power cable, include, for example, the following two paths: contaminants which are present as impurities in the low density polyethylene, which is the base polymers comprising the structural material of the composition, the cross-linking agent, and the antioxidant, and contaminants entering during the process of production of the composition. The total of all electroconductive impurities contaminating the composition by either path has a direct relationship to the tanδ characteristics. Accordingly, it can be said that a method for sorting compositions based on the total amount of electroconductive impurities contained in the insulating composition is most effective. The basic conditions therefor are to make an estimate of the total amount of electroconductive impurities by means of "tanδ and the volume resistivity ρ before and after extraction processing of the composition with an organic solvent", "the volume resistivity of an extract obtained by processing 10 g of cross-linked composition with 10 ml of nonpolar solvent", and "the conductivity of an extract obtained by processing 10 g of cross-linked composition with 10 ml of polar solvent", and using those compositions which satisfy the following conditions: "$\tan\delta_1/\tan\delta_2 \leq 5$, and/or, $\rho_2/\rho_1 \leq 5$, under conditions of a temperature of 90° C. and stress of 20 kV/mm", "a value obtained when the volume resistivity is multiplied by the viscosity of the extract is greater than or equal to $5\times10^{10}$ Ω Pa/m", and "a value obtained when the amount of increase in conductivity is divided by the viscosity of the extract, is less than or equal to $5\times10^{-5}$ S/Pams".

The reason the "cross-linked compositions" are employed as the testing materials in order to obtain an understanding of the total amount of electroconductive impurities is that in this way, all of the conditions during the cross-linking reaction which is undergone by the actual insulating layers of power cables will be reflected in the evaluated characteristic values; that is to say, in the volume resistivity and the conductivity of the extract. The cross-linking reaction itself is a so-called "radical reaction"; however, it is necessary to reflect, in the volume resistivity of the extract, which comprises the evaluation characteristics, all of the changes involving ion dissociative impurities caused by high temperatures in excess of approximately 160° C. which are circumstantial conditions of this complicated reaction or the cross-linking reaction. By means of conducting this type of evaluation, it is possible to maintain the tanδ characteristics and in particular, the superior tanδ characteristics in high temperatures and in high strength electric fields of extra-high voltage cables having insulating layers comprising cross-linked compositions.

The evaluation by means of "tanδ and volume resistivity ρ after and before the extraction processing of a cross-linked composition by an organic solvent", "the volume resistivity of an extract obtained when a cross-linked composition is processed with a nonpolar solvent", or "the conductivity of an extract which is obtained when a cross-linked composition is processed with a polar solvent", in order to gain an understanding of the total amount of ion dissociative impurities present in the insulating layer, is one of the characteristic processes of the present invention.

The concentration of ion dissociative impurities present in the insulating layer is such that the substances are difficult to identify, as they are present in extremely small amounts. For this reason, electric evaluation of the concentration of ion dissociative impurities, such as by means of tanδ and volume resistivity ρ, is more sensitive than normal chemical analysis methods.

The reason for the conducting of "the extraction processing of a cross-linked composition with an organic solvent" is that by means thereof, the concentration in the extract of the ion dissociative impurities, which are present at extremely low concentrations, may be made as high as possible.

Either nonpolar solvents or polar solvents may be employed as the organic solvents. Examples of nonpolar solvents include, for example, hexane, heptane, octane, benzene, toluene, xylene, and the like. Polar solvents include, for example, water, alcohols having 5 carbon atoms or fewer, ketones having 5 carbon atoms or fewer, esters having 5 carbon atoms or fewer, nitriles having 5 carbon atoms or fewer, acid amides having 5 carbon atoms or fewer, carbonates having 5 carbon atoms or fewer, γ-butyrolactone, N-methylpyrolidone, and the like.

Furthermore, the volume resistivity or conductivity of the liquid in which the ion dissociative impurities present in the insulating layer were extracted is determined by the degree of ion dissociation of the impurities, the mobility of the individual dissociating ions, and the like, to which the concentration of the ion dissociative impurities and the dielectric constant of the liquid used in the extraction also have a relationship. In general, the degree of ion dissociation increases as the dielectric constant increases, that is to say, as the polar solvent increases. However, the cross-linked polyethylene, which is the material used for the insulating layer of the power cable, is nonpolar, and the relative dielectric constant is on the level of 2.1–2.4, in the temperature range in which the power cables are used. Accordingly, it is preferable that the evaluation of the total amount of ion dissociative impurities, which cause the tanδ characteristics to worsen, in the cross-linked polyethylene, be conducted by means of an extract using a nonpolar solvent having a relative dielectric constant which is approximately equivalent to that of the cross-linked polyethylene. From this standpoint, a nonpolar solvent is used as the solvent employed in the extraction of the ion dissociative impurities present in the cross-linked polyethylene composition. The polar solvent should be a hydrocarbon having a boiling point within a range of 50°–100° C.; for example, such hydrocarbons include hexane, heptane, octane, benzene, toluene, xylene, and the like.

Furthermore, it is also possible to use polar solvents in the extraction of the ion dissociative impurities present in the cross-linked polyethylene composition. Examples of such polar solvents include, for example, water, alcohols having 5 carbon atoms or fewer, ketones having 5 carbon atoms or fewer, esters having 5 carbon atoms or fewer, nitriles having 5 carbon atoms or fewer, acid amides having 5 carbon atoms or fewer, carbonates having 5 carbon atoms or fewer, γ-butyrolactone, N-methylpyrolidone, and the like. Among these polar solvents, even the smallest relative dielectric constant is greater than 5. Fundamentally, it is possible to use the polar solvents listed above, which have been purified to a high degree of purity, as the extraction solvent in the present invention. Among these, solvents which are easily obtainable at a high level of purity, which do not possess excessive volatility, which are relatively unaffected in an atmospheric environment, and which are preferable from the point of the view of conductivity evaluation include, for example, alcohols having a number of atoms in the range of 2–4, propionitrile, methylethyl ketone, and the like.

The reason for conducting "the extraction processing of 10 g of cross-linked composition with 10 ml of nonpolar solvent or polar solvent" is that, in this way, the concentration of ion dissociative impurities, which are present in extremely small concentrations in the extract, is increased to the greatest extent possible. In cases of extremely low concentration, the volume resistivity of the extract is inversely proportional to the concentration, while the conductivity of the extract is in a proportional relationship with the concentration, so that even in cases in which the composition ratio during extraction processing varies from the prescribed ratio, it is possible to convert to the predetermined value of the composition ratio by compensating for the differences in the composition ratio by means of the proportional relationships.

The volume resistivity of the extract obtained by the sufficient processing of a cross-linked composition with the prescribed extraction solvents can be seen as the inverse of the sum of the conductivity of the nonpolar solvent which was used in the extraction and the conductivity caused by the ions dissociating from the ion dissociative impurities present in the cross-linked composition. The volume resistivity of the extract is reduced to at least a fraction of the volume resistivity of the highly purified solvent employed in the extraction; this indicates a characteristic value which is determined by the ion dissociative impurities which are extracted. Accordingly, the "volume resistivity of the extract" has a value which is in relation to the amount of ion dissociative impurities which are present in the cross-linked composition and which exert an undesirable influence on the tanδ value of the cross-linked polyethylene. On the other hand, the conductivity of the extract obtained by the sufficient processing of the cross-linked composition can be seen as the sum of the conductivity of the polar solvent which is employed in the extraction and the conductivity caused by the ions dissociating from the ion dissociative impurities which are present in the cross-linked composition. Accordingly, "the amount of increase in the conductivity" has a value which has a relationship to the total amount of ion dissociative impurities present in the cross-linked composition.

The volume resistivity or amount of increase in conductivity of the extract in which the ion dissociative impurities present in the cross-linked composition are extracted depends on the ion concentration in the extract, the degree of dissociation to ions, and the mobility of the ions.

The measurement temperature of the volume resistivity is affected by both the degree of dissociation and the mobility, so that it is necessary to fix the volume resistivity evaluation temperature; in the present invention, this evaluation was normally conducted at a temperature of 50° C. Furthermore, the mobility of the ions depends on the viscosity of the extract, so that this differs depending on the type of nonpolar solvent; however, in general, since the (mobility×viscosity=a constant value) relationship is established, in order to eliminate the effects resulting from the viscosity of the solvent, conversion to the characteristic value is effected by means of the formula (volume resistivity×viscosity of the solvent). Furthermore, with respect to the nonpolar solvent used in the extraction, one reason for setting the boiling point within a range of 50°–100° C. is that, by using a solvent having low viscosity, a large decrease in volume resistivity can be expected even at very low concentrations. It is possible to use a standard electrode and insulating resistance measurement apparatus for measurement of the volume resistivity of an insulating oil as the measurement apparatus for the volume resistivity of the extract.

The conductivity measurement temperature is affected by both the degree of dissociation and the mobility, so that it is necessary to maintain a constant conductivity evaluation temperature, and this is normally conducted at a temperature of 25° C. Furthermore, the mobility of the ions depends on the viscosity of the extract, so that this differs based on the type of polar solvent; however, in general, as the relationship (mobility×viscosity=a constant value) is established, in order to eliminate the effects resulting from the viscosity of the solvent, conversion to the characteristic value is accomplished by the formula (amount of increase in conductivity÷viscosity of the solvent). It is possible to use a conductivity measuring apparatus for standard solutions as the conductivity measurement apparatus for the extract. Platinum is generally employed in the electrode of the measurement apparatus; however, in order to avoid adsorption to the electrode, it is desirable to employ a measurement apparatus for precision measurement using a glossy platinum electrode.

The stipulation that "the ration of tanδ before and after extraction is such that $\tan\delta_1/\tan\delta_2 \leq 5$, and the ratio of volume resistivity ρ is such that $\rho_2/\rho_1 \leq 5$" is necessary in order to guarantee that tanδ will be within a range of approximately 0.01–0.05% under conditions of 90° C. and 30 kV/mm, and the stipulation that "the value obtained when the volume resistivity of the extract is multiplied by the viscosity of the extract is greater than or equal to $5\times10^{10}$ Ω Pa/m" or that "the value obtained when the amount of increase in the conductivity is divided by the viscosity is less than or equal to $5\times10^{-5}$ S/Pams" is necessary in order to guarantee that tanδ will be less than or equal to 0.07% under conditions of 90° C. and 25 kV/mm; in the present invention, this value has been established as a result of numerous considerations. The tanδ of a cross-linked composition having characteristic values in excess of these stipulations exceeds 0.07%, when evaluated at 90° C., even if the stress does not exceed 20 kV/mm, and this is a main cause of conductivity.

The conditions in the case in which the cross-linked composition is subjected to extraction processing using an organic solvent, a nonpolar solvent, or a polar solvent do not constitute fundamentally essential conditions. Rather, it is necessary to guarantee conditions in which almost all of the ion dissociative impurities present in the cross-linked composition can be extracted. For this purpose, it is generally necessary to make the cross-linked composition as thin as possible and to bring it into contact with the solvent. In order to accelerate the extraction, it is possible to employ ultrasound, or to use Soxhlet extraction employing a heated solvent, or the like.

The polyethylene composition (II) in accordance with the present invention meets the condition that the dielectric loss tangent be within a range of 0.01–0.07% at a temperature of 90° C. and an electric field stress of 20 kV/mm, so that the electroconductive impurities which cause an increase in the dielectric loss tangent (tanδ) under conditions of high temperature and high electric field stress are not present, and accordingly, it is possible to suppress the increase in size of the dielectric loss tangent (tanδ) which is caused by the electroconductive impurities, and by means of this, it is possible to produce insulations or joints for use in extra-high voltage cables having little dielectric loss.

Furthermore, the polyethylene compositions (III) and (IV) in accordance with the present invention meet the condition that the dielectric loss tangent at a temperature of 90° C. and under electric field stress of 20 kV/mm be less than or equal to 0.07%, so that functional effects identical to those in the case of the above-described polyethylene composition (II) are obtained.

Next, polyethylene composition (V) will be explained.

This polyethylene composition (V) is such that, in the polyethylene composition (I), the cross-linking agent comprises DCP, and this DCP is such that an oil comprising 2 parts by weight of this DCP dissolved in 100 parts by weight of a Type 1-Number 1-alkylbenzene oil, in accordance with JIS (Japanese Industrial Standard) -C-2320 and having a volume resistivity of $1\times10^{15}$ Ω·cm or more as calculated from the insulating resistance obtained after the passage of 1 minute in accordance with JIS-C-2101 (testing method for electrically insulating oils) under conditions of 80° C. and DC 500 V, has a volume resistivity of $1\times10^{14}$ Ω·cm or more as calculated from the insulating resistance after the passage of 1 minute obtained in accordance with JIS-C-2101 under conditions of 80° C. and DC 500 V.

The present inventors have discovered that there is a relationship between the dielectric loss tangent (tanδ) of the insulator, and the volume resistivity of an oil comprising a predetermined amount of DCP dissolved in an electrically insulating oil, and in particular, have determined that it is possible to measure, with good reproducibility, the insulating resistance of an oil in which 2±0.5 g of DCP is added to an electrically insulating oil, after the passage of 1 minute, in accordance with JIS-C-2101 (testing method for electrically insulating oils) under conditions of 80° C. and DC 500 V, and it is possible to accurately prescribe the purity of the DCP from the volume resistivity calculated from this insulating resistance, and have thus arrived at the present invention.

The calculation of the volume resistivity from the insulating resistance is accomplished by means of the Formula (XI) given below.

$$\rho = R \cdot S/t \quad (XI)$$

(In the formula, ρ indicates the volume resistivity (Ω·cm), R indicates the insulating resistance (Ω), S indicates the electrode surface area (cm²), and t indicates the thickness of the testing material (cm).)

Furthermore, with respect to the dielectric loss tangent (tanδ) of an insulator produced using conventional DCP, when this dielectric loss tangent was measured in a manner identical to that of the measurement method for dielectric loss tangents given above, it was found to be within a range of 0.071–0.5%. Here, the measurement conditions were such that the atmospheric temperature during measurement was 90° C., and the applied stress was 20 kV/mm.

In the present invention, the electrically insulating oil used in order to prescribe the purity of the DCP is the Type 1, Number 1, alkylbenzene oil in accordance with JIS-C-2320, and is an oil of high purity such that the volume resistivity is $1\times10^{15}$ Ω·cm or more, as calculated from the insulating resistance after the passage of 1 minute obtained in accordance with JIS-C-2101 (testing method for electrically insulating oil) under conditions of 80° C. and DC 500 V. A Type 1, Number 1, alkylbenzene oil in accordance with JIS-C-2320 obtained at an industrial grade, which has been subjected to purification processing and the purity of which has been thereby increased, may be employed as this highly pure electrically insulating oil. No particular restriction is made with respect to the purification processing of the alkylbenzene oil; however, a method may be adopted, for example, in which the oil is mixed with activated alumina, and the impurities are caused to adsorb thereto, and this is then subjected to filtration.

The DCP which is employable herein is highly pure DCP such that an oil obtained by dissolving 2 parts by weight of this DCP in 100 parts by weight of the alkylbenzene oil described above has a volume resistivity of $1\times10^{14}$ Ω·cm or more, as calculated from the insulating resistance after the passage of 1 minute obtained in accordance with JIS-C-2101 (testing method for electrically insulating oils) under conditions of 80° C. and DC 500 V.

If the volume resistivity of the alkylbenzene oil having the DCP dissolved therein is less than or equal to $1\times10^{14}$ Ω·cm, the removal of the electroconductive impurities contained in the DCP is imperfect, and it is impossible to sufficiently reduce the dielectric loss tangent of an insulator comprising a polyethylene composition containing this DCP.

Types of highly pure DCP which are employable herein include, for example, DCP such that in the process of washing with water or the like after synthesis, the surfactant which is added in order to increase the cleaning effect is replaced with one which will not reduce the volume resistivity, DCP which is obtained at an industrial grade and which is subjected to purification processing and the purity of which is thereby increased, or DCP which is obtained by the use of a reaction vessel which is unlikely to admit impurities in the production thereof; the volume resistivity of all of the above, as derived in accordance with JIS-C-2101 (testing method for electrically insulating oils), is $1\times10^{14}$ $\Omega\cdot$cm or more. Here, a recrystallization method by means of organic solvent, in which DCP is mixed with an equivalent amount of ethanol, this is heated to a temperature of 40° C. and dissolved, and recrystallization is carried out by cooling to a temperature of, for example, 20° C., and DCP crystals of high purity are thus obtained, or a commonly-known purification processing method, such as a dialysis method, an adsorption method, a distillation method, a zone crystallization method, a washing method, or the like, may be adopted as the purification processing method.

The polyethylene composition (V) in accordance with the present invention is a composition in which dicumyl peroxide of high purity is blended, having a volume resistivity of $1\times10^{14}$ $\Omega\cdot$cm or more, this volume resistivity being calculated from the insulating resistance when dissolved in alkylbenzyl oil under fixed conditions, so that the dielectric loss tangent of an insulator obtained therefrom was smaller than that of an insulator obtained from a polyethylene composition in which conventional DCP (of a purity which does not satisfy the condition that the volume resistivity, as calculated from the insulating resistance when dissolved in alkylbenzyl oil under fixed conditions, is $1\times10^{14}$ $\Omega\cdot$cm), which was not subjected to purification processing, was blended, so that it is possible to produce insulations or joints for use in extra-high voltage cables having little dielectric loss.

Next, the polyethylene composition (VI) will be explained.

This polyethylene composition (VI) is such that, in one of the polyethylene compositions (I) to (V), the antioxidant is such that when 0.1 g of the antioxidant is dissolved in 100 ml of an electrically insulating oil having an insulating resistance of $1\times10^{16}$ $\Omega\cdot$cm or more, the insulating resistance of the resulting electrically insulating oil is $1\times10^{14}$ $\Omega\cdot$cm or more.

The present inventors have discovered that there is a relationship between the dielectric loss tangent (tanδ) of the insulator and the insulating resistance of an electrically insulating oil in which a predetermined amount of an antioxidant was dissolved; in particular, they have discovered that it is possible to measure, with good reproducibility, the insulating resistance of an electrically insulating oil in which 0.1 g of an antioxidant was dissolved in 100 ml of an electrically insulating oil having an insulating resistance of $1\times10^{16}$ $\Omega\cdot$cm or more, and that it is possible to accurately prescribe the degree of purification of the electroconductive impurities present in the antioxidant from this insulating resistance, and that it is possible to reduce the dielectric loss of the insulator by means of eliminating electroconductive impurities from the antioxidant; the present inventors have thus arrived at the present invention.

Purification methods for eliminating the electroconductive impurities in the antioxidant include the methods listed below; a single method may be employed, or 2 or more methods may be employed in a combined manner.

(1) Purification Method Involving Dissolution by Means of a Solvent and Reprecipitation In this method, the antioxidant is dissolved in a solvent at high temperature, and after this, deposition and reprecipitation is caused by means of cooling, and the impurities are removed.

(2) Purification Method by Means of a Solvent Washing

In this method, a finely powdered antioxidant is brought into contact and agitated with a solvent or deionized water, and the impurities are removed by means of washing.

(3) Purification Method by Means of Electrophoresis

In this method, electrodes are inserted into the antioxidant, which is in a molten state, a direct current or the like is applied, and the impurities are collected at the electrodes and removed.

(4) Purification Method by Means of Melting and Recrystallization

In this method, the antioxidant is melted, and is then recrystallized, and the impurities are removed.

Among the above purification methods, the most effective method is that involving dissolution by means of a solvent and reprecipitation; solvents usable in such a method include, for example, nonpolar hydrocarbon solvents such as hexane, heptane, benzene, toluene, xylene, and the like or polar hydrocarbon solvents such as methanol, isopropyl alcohol, acetone, and the like.

The method used to prescribe the degree of purification of the antioxidant which is purified in this manner is such that, for example, those antioxidants are used which meet the conditions that, when measured in accordance with JIS-C-2101 (testing method for electrically insulating oils), the insulating resistance of an electrically insulating oil in which 0.1 g of the antioxidant has been dissolved in 100 ml of electrically insulating oil having an insulating resistance of $1\times10^{16}$ $\Omega\cdot$cm or more is $1\times10^{14}$ $\Omega\cdot$cm or more.

If the insulating resistance of an electrically insulating oil in which the antioxidant has been dissolved is less than or equal to $1\times10^{14}$ $\Omega\cdot$cm, then the removal of the electroconductive impurities contained in the antioxidant is imperfect, and it is not possible to sufficiently reduce the dielectric loss tangent of an insulator comprising a polyethylene composition containing this antioxidant.

In the polyethylene composition (VI) in accordance with the present invention, an antioxidant having an insulating resistance, when dissolved in an electrically insulating oil under fixed conditions, of $1\times10^{14}$ $\Omega\cdot$cm or more, was blended, so that the dielectric loss tangent of an insulator obtained therefrom was smaller than that of an insulator obtained from a polyethylene composition into which a conventional antioxidant (one having a purity such that the the insulating resistance when dissolved in an electrically insulating oil under fixed conditions was less than $1\times10^{14}$ $\Omega\cdot$cm), which had not been subjected to purification processing, was blended, so that it is possible to produce insulations or joints for use in extra-high voltage cables having little dielectric loss.

The polyethylene compositions (I)–(VI) described above are such that, when producing the desired form, that is to say, a power cable or items relating thereto, after the composition has been formed into the desired shape as various insulations which are incorporated in an integrated manner, the cross-linked polyethylene (XLPE) comprising the insulations is formed by means of heating.

Next, the extra-high voltage cable and joint therefor of the present invention will be explained.

This extra-high voltage power cable has an insulating layer comprising one of the above-described polyethylene compositions (I)–(VI).

The production of the above-described extra-high voltage power cable is accomplished, for example, as follows: a conventional production method, for example, a method in which formation is conducted by means of 3-layer simultaneous extrusion coating in which an inner semiconducting layer, an insulating layer comprising one of the polyethylene compositions (I) through (X), and an outer semiconducting layer are formed on a conductor, and this is cross-linked, is carried out; in this production process, it is necessary to pay careful attention so that impurities are not introduced into the insulating layer, in particular in the extrusion process.

In this type of extra-high voltage cable, an insulating layer, comprising one of the above-described polyethylene compositions (I)–(VI), is present, so that, since the dielectric loss tangent of the insulating layer is small, the dielectric loss of the cable itself is small, even when used for extra-high voltage of 275 kV or more.

Furthermore, the joint for the extra-high voltage power cable comprises one of the above-described polyethylene compositions (I) through (VI).

The method for the formation of the joint of the above-described extra-high voltage cable is as follows: the insulating layers of the end portions of the extra-high voltage power cable to be jointed are removed, and the conductors are thus exposed, these conductors are placed in contact, and the conductors are joined by means of the same conductive material as that of the conductors, then a form for molding is attached around the jointing portion of the conductors and around the insulating layer in the vicinity thereof, one of the polyethylene compositions (I) through (VI) is caused to flow into the form for molding, this is heated, and the form for molding is finally removed, and the exposed portion of the conductors is thus covered by a cross-linked polyethylene composition, and it is thus possible to obtain the joint which is the object of this process.

This type of joint for extra-high voltage cables comprises one of the above-described polyethylene compositions (I)–(VI), so that, since the dielectric loss tangent of the joint is small, the dielectric loss of the joint is small even when used in extra-high voltage of 275 kV or more.

In the polyethylene composition of the present invention, it is possible to add other additives, where necessary, in addition to the above-described cross-linking agent and antioxidant; however, it is necessary to use these additives only after removing electroconductive impurities in a similar manner to the purification methods described above.

Hereinbelow, the effects of the present invention will be explained using concrete embodiments.

Preferred Embodiment 1

Using low density polyethylene (hereinbelow referred to as LDPE) as a base polymer, an LDPE (A) having a low level of impurities (MFR=1 g/10 minutes, D=0.92 g/cm$^3$) was prepared.

Using the cross-linking agent DCP, and an antioxidant (4,4'-thiobis-(6-tertbutyl-3-methyl phenol)), the level of impurities were reduced to an extremely low level by means of solvent purification (impurity level A).

Two parts per weight of cross-linking agent and 0.2 parts by weight of antioxidant were blended into 100 parts by weight of the above LDPE(A) and a composition was thereby produced.

Using the composition thus obtained, and by means of a normal method, a power cable was produced by means of 3-layer simultaneous extrusion in which the thickness of the insulating layer was 9 mm and the cross-sectional area of the conductor was 400 mm$^2$, and by means of a dry-type cross-linking process.

Preferred Embodiment 2

A power cable was produced in manner identical to that described in Preferred Embodiment 1, with the exception that, during the purification of the additives (the cross linking agent and the antioxidant), the impurity level was slightly higher (impurity level B).

Preferred Embodiment 3

A power cable was produced in manner identical to that described in Preferred Embodiment 1, with the exception that LDPE having a high impurity level (B) was used.

Comparative Example 1

A power cable was produced in manner identical to that of Preferred Embodiment 1, with the exception that the additives were not purified (impurity level C).

Comparative Example 2

A power cable was produced in manner identical to that of Preferred Embodiment 1, with the exception that an LDPE (B) having a high level of impurities was used, and additives having the impurity level (B) were used.

Comparative Example 3

A power cable was produced in manner identical to that of Preferred Embodiment 1, with the exception that an LDPE (B) having a high level of impurities was used, and the additives were not purified (impurity level C).

The tanδ values of the power cables of these Preferred Embodiments 1–3 and Comparative Examples 1–3 were measured under conditions of high temperature and high field stress (90° C., 20 kV/mm).

The results are shown in Table 1.

Films (having a thickness of 100 μm) obtained from the insulator of each cable of Preferred Embodiment 1–3 and Comparative Examples 1–3 were subjected to Soxhlet extraction using n-hexane, and the ratio of the values of tanδ and the ratio of the values of ρ before and after extraction were measured.

The results are shown in Table 1.

As can be seen from Table 1, in the power cables of Comparative Examples 1–3, either or both of the base LDPE and the additives contain a large amount of impurities, and films taken from all of these cables have values of $\tan\delta_1/\tan\delta_2$ and $\rho_2/\rho_1$ which are in excess of 5, and furthermore, the tanδ value of these cables was large.

In contrast, in the power cables of Preferred Embodiments 1–3, both the base LDPE and the additives contain little impurities, and the $\tan\delta_1/\tan\delta_2$ and $\rho_2/\rho_1$ values of the films obtained from the cables were less than or equal to 5.

Furthermore, in accordance with this, the tanδ value of the cables was low, so that superior tanδ characteristics were maintained, even at high temperatures and under strong electric fields.

TABLE 1

| | CABLE INSULATOR MATERIAL | | CABLE tanδ | FILM EXTRACTED FROM CABLE | |
|---|---|---|---|---|---|
| | LDPE | PURIFICATION/NONPURIFICATION OF ADDITIVES (IMPURITY LEVEL) | | $\dfrac{\tan\delta_1}{\tan\delta_2}$ | $\dfrac{\rho_1}{\rho_2}$ |
| PREFERRED EMBODIMENT 1 | A | Purified (a) | 0.02 | 1.4 | 1.7 |
| PREFERRED EMBODIMENT 2 | A | Purified (b) | 0.04 | 3.5 | 4.0 |
| PREFERRED EMBODIMENT 3 | B | Purified (a) | 0.05 | 5.0 | 4.8 |
| COMPARATIVE EMBODIMENT 1 | A | Unpurified (c) | 0.14 | 7.2 | 8.2 |
| COMPARATIVE EMBODIMENT 2 | B | Purified (b) | 0.12 | 6.1 | 7.5 |
| COMPARATIVE EMBODIMENT 3 | B | Unpurified (c) | 0.23 | 11.5 | 13.0 |

Preferred Embodiment 4

PE(D) was prepared for use as the LDPE. In this PE(D), MFR was on the level of 1, and the PE(D) was polymerized by means of a cleaning of the polymerization process of PE(E), which has been conventionally employed as a cross-linking insulating composition for use in power cables, and in particular, is polymerized with attention to the avoidance of the introduction of ion-dissociative impurities.

A commercially-available DCP(D), and a DCP(E) purified therefrom by means of recrystallization, were prepared for use as the cross-linking agent.

As the antioxidant, a 4,4'-thiobis-(6-tertbutyl-3-methyl phenol), which is effective relative to polyolefins, comprising a commercially available product (F), and a product (G) comprising a purification of this by means of recrystallization, were prepared.

Two parts per weight of cross-linking agent (e) and 0.2 parts per weight of antioxidant (g) were blended into 100 parts per weight of the above PE(D), and a composition was thereby produced. The outlines of the production process of the composition are as follows: the antioxidant was kneaded into the composition by means of an extruder for kneading at a temperature of 180° C., this was subjected to extraction in a strand form, cutting was performed in cold water to form pellets, and after desiccation, and the pellets were brought into contact with the cross-linking agent at a temperature of approximately 80° C. and dissolved.

Here, the production process was made cleaner in the following manner. Briefly, the cold water used at the time of the formation of the pellets was replaced with ultrapure water such as that used in electrical engineering and the like, and furthermore, 2 batches comprising solely PE(D) were run through the machinery and lines after the cross-linking agent blending process, and the absorption and removal of the impurities was thus conducted.

The composition which was thus obtained was preliminarily formed into testing materials with thicknesses of 0.2 mm and 10 mm and dimensions of 10×10 cm, under pressing conditions of 120° C., and these testing materials were formed into cross-linked polyethylene (XLPE) by the application of pressure for a period of 10 minutes under conditions of 180° C. and a pressure of 20 kgf/cm².

The stress changes in the tanδ value of the test material having a thickness of 0.2 mm were measured at a temperature of 90° C., and the stress at which tanδ would exceed 0.07% was estimated.

The test material having a thickness of 10 mm was used for volume resistivity measurement or for conductivity measurement. In the case in which this test material was used in volume resistivity measurement, sheets of approximately 0.2 mm were formed therefrom by means of a clean slicer, 30 g of these sheets and 30 ml of highly pure n-hexane were combined, and extraction was conducted for a period of 2 hours in the presence of ultrasound of 20 kHz and 1 W/cm². The n-hexane which was used in the extraction was obtained by subjecting a reagent quality n-hexane to non-boiling distillation, and further subjecting this to adsorption processing using activated alumina, so that it had a volume resistivity at 50° C. of $2\times10^{14}$ Ω/m and a viscosity at 50° C. of $92.1\times10^{-2}$ Pa.

Furthermore, in the case in which this test material was used in measurement of conductivity, an extraction was conducted in a manner identical to that of the measurement of volume resistivity, with the exception that in place of the highly pure n-hexane, 30 ml of highly pure ethanol was used. The ethanol which was used in the extraction was obtained by subjecting a reagent quality ethanol to non-boiling distillation, and furthermore subjecting this to adsorption processing using activated alumina, so that this ethanol had a conductivity at 25° C. of $2\times10^{-8}$ S/m, and a viscosity at 25° C. of $9.5\times10^{-2}$ Pa.

Preferred Embodiment 5

Test materials were prepared in a manner identical to that of Preferred Embodiment 1, with the exception that the production process of the composition was not made clean.

Comparative Examples 4–9

PE(E), (F), and (G), which were conventionally used in cross-linking insulating compositions for use in power cables, were used as the LDPE.

As the cross-linking agent DCP, in addition to the DCP(E) which was purified by means of recrystallization, a DCP(D), which was not subjected to recrystallization, was prepared.

As the antioxidant (4,4'-thiobis-(6-tertbutyl-3-methyl phenol)), in addition to antioxidant (G), which was purified by means of recrystallization, an antioxidant (F), which was not subjected to this recrystallization processing, was prepared.

Cross-linking agent and antioxidant were blended into the LDPE in accordance with the blending amounts shown in Table 2, and compositions were prepared. In the kneading processes, cleaning was not carried out.

Thereafter, the test materials of Comparative Examples 4 through 9 were produced in a manner identical to that of the above-described preferred embodiment.

Using the test materials of Preferred Embodiments 4-5 and Comparative Examples 4-9, an estimate of the stress at which the value of $\tan\delta$ at a temperature of 90° C. would exceed 0.05%, the volume resistivity of the extract, and the viscosity and the conductivity were evaluated.

The results thereof are shown in Tables 2 and 3, respectively.

The volume resistivity of the extract is smaller in all cases than that of the n-hexane which was used in the extraction, and the viscosity of the extract is greater than that of the n-hexane. Furthermore, the conductivity of the extract is greater than that of the ethanol which was used in the extract in all cases, while the viscosity of the extract was also greater than that of the ethanol. It may be assumed that the decrease in volume resistivity or increase in conductivity is due to the fact that the ion-dissociative impurities contained in the cross-linked composition were extracted, while the increase in viscosity is thought to be due largely to the fact that the reaction residue of the cross-linking agent was extracted.

As can be seen in Table 3, the stresses at which the value of $\tan\delta$ of the test materials of the Comparative Examples would exceed 0.07% at a temperature of 90° C. was considerably below 20 kV/mm in all cases, so that these test materials were not suitable for the desired improvements. Furthermore, in the Comparative Examples 4-9 in which a reduction of ion-dissociative impurities was conducted, as well, the "value obtained when the volume resistivity of the extract of the cross-linked composition was multiplied by the viscosity of the extract" was smaller than $5\times10^{10}$ Ω Pa/m, and the "value obtained when the amount of increase in conductivity of the extract of the cross-linked composition was divided by the viscosity of the extract" was in excess of $5\times10^{-5}$ S/Pams, and the stress at which the value of $\tan\delta$ at a temperature of 90° C. would exceed 0.07% was less than or equal to 20 kV/mm in all cases, so that these test materials were unsuitable for the desired improvement.

In contrast, as shown in Table 2, in the test materials of Preferred Embodiments 4 and 5, the "value obtained when the volume resistivity of the extract of the cross-linked composition was multiplied by the viscosity of the extract" was in excess of $5\times10^{10}$ Ω Pa/m, and the "value obtained when the amount of increase in the conductivity of the extract of the cross-linked composition was divided by the viscosity of the extract" was less than or equal to $5\times10^{-5}$ S/Pams, and furthermore, the value of $\tan\delta$ at a temperature of 90° C. and at 20 kV/mm was less than or equal to 0.07% in both cases, so that these test materials possessed characteristics capable of meeting the requirements of the present invention.

TABLE 2

| | | PREFERRED EMBODIMENTS | |
|---|---|---|---|
| | | 4 | 5 |
| COMPOSITION BLEND (Parts Per Weight) | PE | D 100 | D 100 |
| | CROSS-LINKING AGENT | E 2 | E 2 |
| | ANTIOXIDANT | G 0.2 | G 0.2 |
| CLEANING OF KNEADING PROCESS | | CLEANED | NON-CLEANED |
| Stress (kV/mm$^{-1}$) at which tanδ of XLPE reaches 0.05% at 90° C. | | 30 or more | 28 |
| tanδ/% at 20 kV/mm | | 0.018 | 0.035 |
| Characteristic Value of Extract (Value of Volume Resistivity of Extract Multiplied by Viscosity) × 10$^{10}$ Ω Pa/m | | 60 | 13 |
| Characteristic Value of Extract (Value of Amount of Increase in Conductivity of Extract Divided by Viscosity) × 10$^{-5}$ S/Pams | | 1.5 | 3.8 |

TABLE 3

| | | COMPARATIVE EXAMPLES | | | | | |
|---|---|---|---|---|---|---|---|
| | | 4 | 5 | 6 | 7 | 8 | 9 |
| COMPOSITION BLEND (Parts Per Weight) | PE | E 100 | F 100 | G 100 | E 100 | F 100 | G 100 |
| | CROSS-LINKING AGENT | D 2 | D 2 | D 2 | E 2 | E 2 | E 2 |
| | ANTIOXIDANT | F 0.2 | F 0.2 | F 0.2 | G 0.2 | G 0.2 | G 0.2 |
| CLEANING OF KNEADING PROCESS | | Non-Cleaned | Non-Cleaned | Non-Cleaned | Non-Cleaned | Non-Cleaned | Non-Cleaned |
| Stress (kV/mm$^{-1}$) at which tanδ of XLPE reaches 0.05% at 90° C. | | 12 | 10 | 9.5 | 17 | 15 | 18 |
| tanδ/% at 25 kV/mm | | 0.25 | 0.37 | 0.52 | 0.07 | 0.09 | 0.11 |
| Characteristic Value of Extract (Value of Volume Resistivity of Extract Multiplied by Viscosity) | | 0.59 | 0.50 | 0.29 | 1.5 | 1.2 | 0.95 |

TABLE 3-continued

|  | COMPARATIVE EXAMPLES | | | | | |
| --- | --- | --- | --- | --- | --- | --- |
|  | 4 | 5 | 6 | 7 | 8 | 9 |
| $\times 10^{10}$ Ω Pa/m Characteristic Value of Extract (Value of Amount of Increase in Conductivity of Extract Divided by Viscosity) $\times 10^{-5}$ S/Pams | 17 | 20 | 35 | 6.5 | 8.7 | 10.5 |

Preferred Embodiments 6

Highly pure DCP was obtained by means of production method m. Production method m refers to a method in which DCP obtained by means of a conventional production method for DCP (production method n) was added to a similar amount of methanol, this was cooled, heated to a temperature of 40° C., and dissolved, and was then again cooled to a temperature of 20° C., and caused to recrystallize, and purification processing was thus carried out.

By mixing the Type 1, Number 1, alkyl benzene oil of JIS-C-2320 with activated alumina and thus adsorbing the impurities, and subjecting this oil to filtration, an alkyl benzene oil was obtained which had a volume resistivity of $1\times10^{16}$ Ω·cm, as calculated from the insulating resistance after the passage of 1 minute which was obtained in accordance with the testing method for electrically insulating oils of JIS-C-2101 under conditions of 80° C. and DC 500 V.

Next, the insulating resistance after the passage of 1 minute under conditions of 80° C. and DC 500 V of an oil, in which 2 parts per weight of the DCP obtained by means of the manufacturing methods m described above was dissolved in 100 parts per weight of the alkyl benzene oil described above, was measured by means of the test method for electrically insulating oils of JIS-C-2101, and the volume resistivity was calculated from this insulating resistance. The results thereof are shown in Table 4 below.

Next, 2 parts per weight of the three types of DCP obtained by means of manufacturing methods m described above, were added, respectively, to 100 parts per weight of low density polyethylene (LDPE), and polyethylene compositions were thus produced.

Comparative Examples 10–11

Furthermore, for the purposes of comparison, the insulating resistance of the alkyl benzene oil described above, itself, and the insulating resistance of an oil in which 2 parts by weight of DCP obtained by means of a conventional production method n for DCP (with no purification processing) was added to 100 parts by weight of alkyl benzene oil described above, were measured under conditions identical to those of the examples described above, and the insulating resistances thus obtained were substituted into the Formula (XI) described above, and the various volume resistivities were calculated. The results thereof are shown in Table 4 below.

Next, 2 parts by weight of the DCP which was obtained by means of the production method n described above was added to 100 parts by weight of low density polyethylene (LDPE), and a polyethylene composition was produced.

The polyethylene compositions of the Preferred Embodiments 6 and the Comparative Example 10 described above were formed into sheets, were cross-linked for a period of 40 minutes at a temperature of 160° C., and formed into cross-linked polyethylene sheets having a thickness of 0.2 mm. The dielectric loss tangents (tanδ) of the cross-linked polyethylene sheets which were thus obtained were measured by means of the measurement method shown in FIG. 1. The results thereof are shown in Table 4 below.

Figure 2:
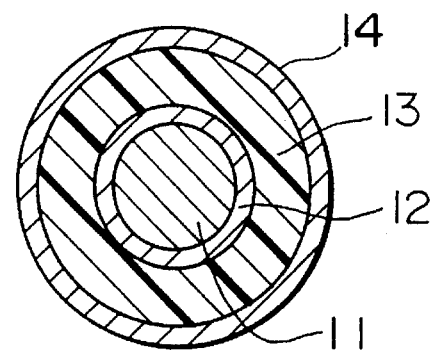
FIG. 2 is a cross-sectional diagram of a power cable employing a compound of the polyethylene composition of the preferred embodiments as an insulating layer.

Next, power cables which were identical to that shown in FIG. 2 and which used, as the insulating layer thereof, the compounds of the four types of polyethylene compositions described above, respectively, were produced. These power cables had a 3-layered structure and comprised a conductor 11 having a cross-sectional area of 400 mm², an inner conductive layer 12 having a volume resistivity of $1\times10^{4}$ Ω·cm, an insulating layer 13 having a thickness of 9 mm and comprising one of the compositions of the present Preferred Embodiments or the Comparative Examples, and an outer connective layer 14 having a volume resistivity of $1\times10^{3}$ Ω·cm. The dielectric loss tangents (tanδ) of the power cables which were thus produced were measured by means of the measurement method shown in FIG. 1, and the results thereof are shown in Table 4 below.

TABLE 4

|  | PREFERRED EMBODIMENT | COMPARATIVE EXAMPLES | |
| --- | --- | --- | --- |
|  | 6 | 10 | 11 |
| TYPE OF DCP | Production Method m (Purification of Production Method n) | none | Production Method n |
| VOLUME RESISTIVITY (Ω · cm) OF OIL IN WHICH 2 PARTS PER WEIGHT OF DCP WERE DISSOLVED IN 100 PARTS PER WEIGHT OF ALKYLBENZENE OIL | $1 \times 10^{16}$ | Alkyl-benzene Oil Only $1 \times 10^{16}$ | $5 \times 10^{13}$ |
| DIELECTRIC LOSS TANGENT OF CROSS-LINKED POLYETHYLENE SHEET (%) | 0.02 | — | 0.10 |
| DIELECTRIC LOSS TANGENT OF POWER CABLE (%) | 0.012 | — | 0.085 |

From Table 4, it was confirmed that the cables of the Preferred Embodiments, which employed DCP having a volume resistivity of $1 \times 10^{16}$ $\Omega \cdot cm$ or more which was derived from the testing method for electrically insulating oils in accordance with JIS-C-2101 above, had dielectric loss tangents (tanδ) which were smaller than those of the Comparative Examples.

Experimental Examples 2 parts by weight of a cross-linking agent (DCP) and 0.2 parts by weight of an antioxidant (4,4'-thiobis-(6-tertbutyl-3-methyl phenol)), which constituted additives, were added to 100 parts per weight of a low density polyethylene (MFR=1, density=0.92 g/cm³) having a dielectric loss tangent (tanδ) of 0.01% under high temperature and high voltage conditions of 90° C. and 20 kV/mm, and a polyethylene composition compound was produced.

Here, the cross-linking agent (DCP) and antioxidant 4,4'-thiobis-(6-tertbutyl-3-methyl phenol) which were employed are both normally commercially available products, and in the use thereof, they were employed both in an unpurified state, as shown in Table 5, and in various purified forms which were subjected to characteristic purification processes and which had differing levels of purification (Levels 1–4).

That is to say, in the case of the cross-linking agent, the DCP was dissolved in n-hexane at a temperature of 50° C., this was sufficiently agitated, and was then cooled to 0° C. and precipitation and recrystallization were thus induced, and a purified cross-linking agent was thus recovered. In the case of the antioxidant, 4,4'-thiobis-(6-tertbutyl-3-methyl phenol) was dissolved in methanol at a temperature of 50° C., this was sufficiently agitated, and was then cooled to a temperature of 0° C. and caused to precipitate, and a purified antioxidant was thus recovered. It was of course the case that the purified cross-linking agent and the purified antioxidant which were thus recovered were subjected to vacuum desiccation and the solvent was thus completely removed.

The purification levels (Levels 1–4) above were obtained by altering the amounts of solvent, cross-linking agent, or antioxidant, and by altering the conditions, such as the number of purification cycles; as the level number increases, the degree of purification becomes higher.

Measurements were conducted in accordance with JIS-C-2101 with respect to the various additives having the differing purification levels (Levels 1–4) described above, and with respect to unpurified additives, and the results of the measurement of the insulating resistance of an oil in which 1 g of cross-linking agent and 0.1 g of antioxidant were dissolved in 100 ml of alkyl benzene oil (electrically insulating oil) having a insulating resistance of $1 \times 10^{16}$ $\Omega \cdot cm$ or more are shown in Table 5.

Furthermore, the results of the measurement of the dielectric loss tangent (tanδ) under high temperature and high electric field conditions of 90° C. and 20 kV/mm, with respect to a cross-linked polyethylene (XLPE) insulating composition, in which the additives were added to low density polyethylene and polyethylene compositions were thus formed, and a compound of these polyethylene compositions was press formed into a film shape under conditions of 160° C. for a period of 60 minutes, are shown in Table 5.

TABLE 5

| | PURIFICATION/NON-PURIFICATION OF ADDITIVES AND LEVEL THEREOF | | INSULATING RESISTANCE (Ω · cm) OF ELECTRICALLY INSULATING OIL WITH DISSOLVED ADDITIVES | tanδ of XLPE (90° C., 20 kV/mm) |
|---|---|---|---|---|
| COMPARATIVE EXAMPLE 12 | No Purification | | $3 \times 10^{13}$ | 0.18 |
| COMPARATIVE EXAMPLE 13 | Purification Carried Out | Level 1 | $7 \times 10^{13}$ | 0.15 |
| PREFERRED EMBODIMENT 7 | | Level 2 | $1 \times 10^{14}$ | 0.05 |
| PREFERRED EMBODIMENT 8 | | Level 3 | $5 \times 10^{14}$ | 0.02 |
| PREFERRED EMBODIMENT 9 | | Level 4 | $1 \times 10^{15}$ | 0.02 |

It can be determined from this Table 5 that in the polyethylene compositions (Preferred Embodiments 7–9) which used the additives having a high degree of purification in the present invention, the insulating resistance of the alkyl benzene oil having these additives dissolved therein was high, and the dielectric loss tangent was small. In contrast, in the polyethylene composition (Comparative Example 12) which used unpurified additives, and in the polyethylene composition (Comparative Example 13) which used additives having a low degree of purification, the insulating resistance and the dielectric loss tangent of the alkyl benzene oil described above were large.

Next, power cables (Preferred Embodiment 10, Comparative Example 14) were produced which used, in the insulations thereof, polyethylene composition compounds having the level of purification shown in Preferred Embodiment 8 and Comparative Example 12 of Table 5, and the results thereof are shown in Table 6.

In the case of these cables, the cross sectional area of the conductor was 400 mm², the thickness of the insulator was 9 mm, and the insulator was formed by means of simultaneous extrusion with the inner and outer semiconducting layers. Furthermore, the measurement of the dielectric loss tangent of these cables was conducted under high temperature and high electric field conditions of 90° C. and 20 kV/mm.

TABLE 6

| | INSULATING COMPOSITION OF XLPE | tanδ OF POWER CABLE |
|---|---|---|
| COMPARATIVE | Compound of | 0.175 |

TABLE 6-continued

| | INSULATING COMPOSITION OF XLPE | tanδ OF POWER CABLE |
|---|---|---|
| EXAMPLE 14 | Comparative Example 12 in TABLE 5 | |
| PREFERRED EMBODIMENT 10 | Compound of Preferred Embodiment 8 in TABLE 5 | 0.022 |

It can be seen from this Table 6 that in the power cable in accordance with the present invention (Preferred Embodiment 10), a superior dielectric loss tangent is obtained. In contrast, in the power cable employing unpurified additives (Comparative Example 14), it can be seen that this dielectric loss tangent is unsatisfactory.

What is claimed is:

1. A polyethylene composition for use in insulations and joints for extra-high voltage cables, comprising an organic peroxide cross-linked polyethylene and an antioxidant, having a dielectric loss tangent (tanδ) of 0.07% or less at a temperature of 90° C. and at an electric field stress of 20 kV/mm.

2. A polyethylene composition for use in insulations and joints for extra-high voltage cables in accordance with claim 1, wherein said polyethylene composition is such that a relationship between a dielectric loss tangent (tanδ$_2$) and volume resistivity (ρ$_2$) of the cross-linked composition, wherein a cross-linking agent and an antioxidant are blended into a low density polyethylene, after being subjected to extraction processing with an organic solvent, and a dielectric loss tangent (tanδ$_1$) and volume resistivity (ρ$_1$) of said composition prior to extraction, is such that, under conditions of a temperature of 90° C. and a stress of 20 kV/mm, $\tan\delta_1/\tan\delta^2 \leq 5$ and/or $\rho_2/\rho_1 \leq 5$.

3. A polyethylene composition for use in insulations and joints of extra-high voltage cables in accordance with claim 1, wherein said polyethylene composition is such that a value obtained when a volume resistivity of an extract obtained when 10 g of a composition, in which 1–5 parts by weight of a cross-linking agent comprising an organic peroxide subjected to purification processing and 0.05–0.5 parts by weight of an antioxidant are blended into 100 parts by weight of low density polyethylene and this is cross-linked, is treated with 10 ml of nonpolar solvent, its value multiplied by a viscosity of said extract, is greater than or equal to $5 \times 10^{10}$ ΩPa/m.

4. A polyethylene composition for use in insulations and joints of extra-high voltage cables in accordance with claim 1, wherein said polyethylene composition is such that a value obtained when an amount of increase in conductivity of an extract obtained when 10 g of a composition, in which 1–5 parts by weight of a cross-linking agent comprising an organic peroxide subjected to purification processing and 0.05–0.5 parts by weight of an antioxidant are blended in 100 parts per weight of low density polyethylene and this is subjected to cross-linking, is treated with 10 ml of a polar solvent, its value divided by the viscosity of the extract, is less than or equal to $5 \times 10^{-5}$ S/Pams.

5. A polyethylene composition for use in insulations and joints of extra-high voltage cables in accordance with claim 1, wherein said cross-linking agent comprises dicumyl peroxide, and an oil obtained by dissolving 2 parts by weight of said dicumyl peroxide in 100 parts by weight of a Type 1-Number 1-alkyl benzene oil in accordance with JIS-C-2320 having a volume resistivity of $1 \times 10^{15}$ Ω·cm or more, which volume resistivity is calculated from an insulating resistance after the passage of 1 minute obtained in accordance with JIS-C-2101 (electrically insulating oil test method) under conditions of 80° C. and DC 500 V, has a volume resistivity of $1 \times 10^{14}$ Ω·cm or more as calculated from an insulating resistance after the passage of 1 minute obtained in accordance with JIS-C-2101 under conditions of 80° C. and DC 500 V.

6. A polyethylene composition for use in insulations and joints of extra-high voltage cables in accordance with one of claim 1 wherein said antioxidant is such that an insulating resistance of an electrically insulating oil which is obtained after dissolving 0.1 g of said antioxidant in 100 ml of electrically insulating oil having an insulating resistance of $1 \times 10^{16}$ Ω·cm or more, is $1 \times 10^{14}$ Ω·cm or more.

7. An extra-high voltage cable, having an insulating layer comprising one of said polyethylene compositions in accordance with one of claims 1 through 6.

8. A joint for extra-high voltage cables, comprising one of said polyethylene compositions in accordance with one of claims 1 through 6.

* * * * *